(12) United States Patent
Koscielniak

(10) Patent No.: US 6,633,427 B1
(45) Date of Patent: Oct. 14, 2003

(54) METHOD OF FORMING PHOTONIC CRYSTALS USING A SEMICONDUCTOR-BASED FABRICATION PROCESS

(75) Inventor: Waclaw C. Koscielniak, Santa Clara, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 85 days.

(21) Appl. No.: 09/929,661

(22) Filed: Aug. 14, 2001

(51) Int. Cl.$^7$ .................... G02F 1/00; H01L 21/311; H01L 29/06
(52) U.S. Cl. ............ 359/321; 438/694; 438/697; 257/21
(58) Field of Search ................ 359/321, 248, 359/245, 250, 332, 237, 238, 585, 586, 587, 588, 344; 343/786, 772, 911 R; 438/694, 697, 690; 372/43, 45; 257/21

(56) References Cited

U.S. PATENT DOCUMENTS

| 5,335,240 A | 8/1994 | Ho et al. ................. 372/39 |
| 5,990,850 A | 11/1999 | Brown et al. ............. 343/912 |
| 5,998,298 A | 12/1999 | Fleming et al. ........... 438/692 |
| 5,999,308 A | 12/1999 | Nelson et al. ............ 359/321 |
| 6,064,511 A | 5/2000 | Fortmann et al. ......... 359/321 |
| 6,521,136 B1 * | 2/2003 | Sfez et al. .................. 216/24 |

* cited by examiner

Primary Examiner—Hung Xuan Dang
Assistant Examiner—Tuyen Tra
(74) Attorney, Agent, or Firm—Mark C. Pickering

(57) ABSTRACT

A photonic crystal is formed on a semiconductor substrate using a semiconductor-based fabrication process by forming a number of alternating layers of material that have different dielectric constants. The layers of material are then etched to form a number of spaced-apart stacks of alternating layers of material. An interstack material is then formed between the stacks.

13 Claims, 6 Drawing Sheets

METHOD OF FORMING PHOTONIC CRYSTALS USING A SEMICONDUCTOR-BASED FABRICATION PROCESS

BACKGROUND OF THE INVENTION

1. Field of the Invention

The present invention relates to a method of forming photonic crystals and, more particularly, to a method of forming photonic crystals using a semiconductor-based fabrication process.

2. Description of the Related Art

A photonic crystal is a spatially-periodic dielectric structure that reflects electromagnetic radiation that falls within a range of frequencies, and passes radiation that falls outside the range of frequencies. The range of frequencies, in turn, is defined by a number of factors, including the center-to-center spacing of the structure and the dielectric constants of the materials used to form the structure.

FIG. 1 shows a perspective view that illustrates a first example of a prior-art photonic crystal 100. As shown in FIG. 1, crystal 100 includes a block 110 that has a first side 112, an opposing second side 114, and a number of first openings 116 formed through block 110 that extend from first side 112 to second side 114.

Block 110 also has a third side 120, an opposing fourth side 122, and a number of second openings 124 formed through block 110 that extend from third side 120 to fourth side 122. In addition, openings 116 and 124, which are perpendicular to each other, are formed in alternating layers. Further, block 110 has a fifth side 126 and an opposing sixth side 128.

In the example shown in FIG. 1, block 110 is a dielectric material and therefore has the dielectric constant of the material, while openings 116 and 124 are air filled and therefore have the dielectric constant of air (openings 116 and 124 can also be filled with other materials). Further, openings 116 and 124 have a center-to-center spacing 130.

In operation, when electromagnetic radiation is incident on fifth side 126, crystal 100 allows frequencies outside of a range to propagate through crystal 100 and exit from sixth side 128, while at the same time stopping frequencies within the range from propagating through crystal 100.

FIG. 2 shows a perspective view that illustrates a second example of a prior-art photonic crystal 200. As shown in FIG. 2, crystal 200 includes a block 210 that has a first side 212, an opposing second side 214, and a number of first rods 216 formed through block 210 that extend from first side 212 to second side 214.

Block 210 also has a third side 220, an opposing fourth side 222, and a number of second rods 224 formed through block 210 that extend from third side 220 to fourth side 222. In addition, rods 216 and 224, which are perpendicular to each other, are formed in alternating layers. Further, block 210 has a fifth side 226 and an opposing sixth side 228.

In the example shown in FIG. 2, rods 216 and 224 are formed from a first dielectric material and therefore have the dielectric constant of the first material. The space between rods 216 and 224, however, is filled with a second dielectric material and therefore has the dielectric constant of the second material. Further, rods 216 and 224 have a center-to-center spacing 230. Crystal 200 operates the same as crystal 100.

One of the difficulties with photonic crystals is that photonic crystals are difficult and/or expensive to manufacture. For example, crystal 100 is formed by drilling openings 116 and 124 through block 110. Drilling, however, has inherent size limitations with regard to the maximum thickness of block 110, the minimum diameter of openings 116 and 124, and the minimum spacing between openings 116 and 124.

On the other hand, crystal 200 requires a number of layers and a large number of processing steps for each layer. For example, the first layer of crystal 200 can be formed by depositing a layer of first material, and masking and etching the first layer to form first rods 216. After this, the second material is deposited to fill up the gaps between first rods 216, and is then planarized to form the first layer. These steps must then be repeated for each layer in crystal 200.

Thus, there is a need for a method of forming photonic crystals that is not subject to the size limitations of drilling and requires substantially fewer processing steps.

SUMMARY OF THE INVENTION

The present invention provides a method for forming a photonic crystal using a semiconductor-based fabrication process. Current-generation semiconductor fabrication processes are capable of producing deep sub-micron device sizes. As a result, the photonic crystal of the present invention can be formed down to sub-micron sizes. In addition, the present invention requires relatively few processing steps, and can be formed as part of an integrated circuit that includes circuitry which responds to the electromagnetic radiation received by the crystal.

In accordance with the present invention, the method begins by forming a first layer of material over a substrate. The first layer of material has a first dielectric constant. Next, a second layer of material is formed on the first layer of material. The second layer of material has a second dielectric constant.

Following this, the forming the first layer step and the forming the second layer step are repeated a predetermined number of times to form a multi-layered structure with alternating layers. The multi-layered structure has a top layer and a plurality of underlying layers. The top layer has a top surface.

Next, the top layer and the underlying layers are etched to form a plurality of photonic stacks and a space between the photonic stacks. The plurality of photonic stacks have a plurality of top surfaces. After this, a layer of interstack material is formed over the substrate to fill up the space between the photonic stacks.

The present invention also includes a photonic crystal that is formed on a semiconductor substrate. The photonic crystal includes a plurality of spaced-apart photonic stacks that are formed over the receiving region of the substrate. The photonic stacks have top surfaces.

Each photonic stack has a plurality of layers of material that alternate between a first layer of material and a second layer of material. The first layer of material has a first dielectric constant, while the second layer of material has a second dielectric constant. The photonic crystal also includes an interstack material that is formed over the substrate between and adjoining the plurality of photonic stacks.

A better understanding of the features and advantages of the present invention will be obtained by reference to the following detailed description and accompanying drawings that set forth an illustrative embodiment in which the principles of the invention are utilized.

DETAILED DESCRIPTION

Figure 1:
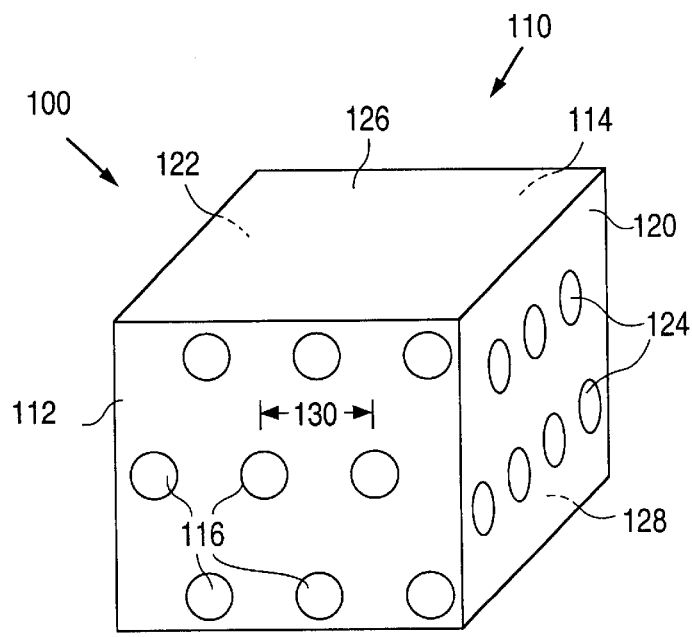
FIG. 1 is a perspective view illustrating a first example of a prior-art photonic crystal 100.
Figure 2:
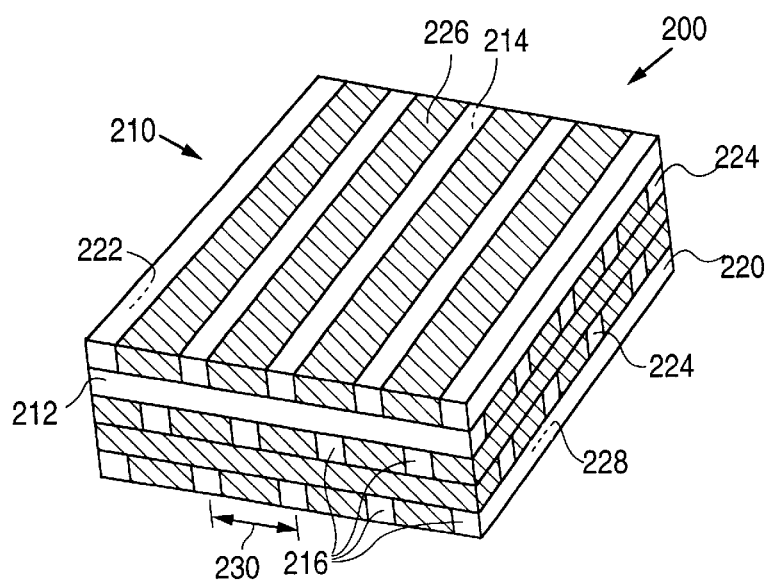
FIG. 2 is a perspective view illustrating a second example of a prior-art photonic crystal 200.
Figure 3A:
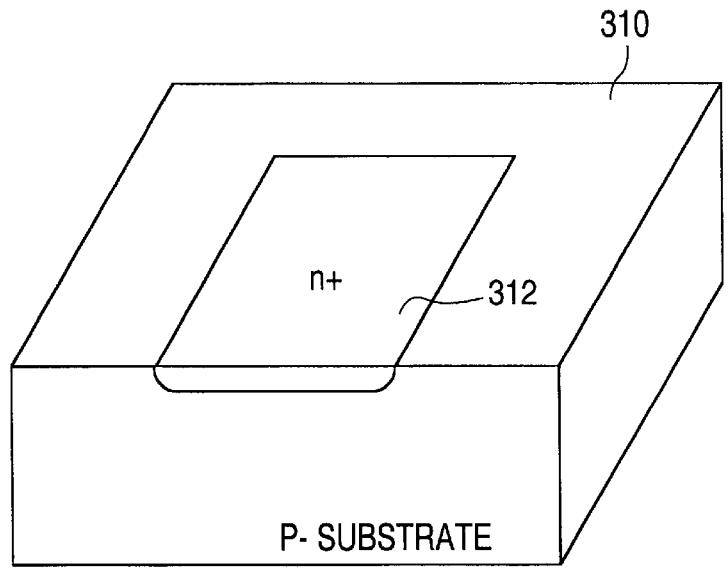
FIGS. 3A–3F show perspective views illustrating a method of forming photonic crystals in accordance with the present invention.

FIGS. 3A–3F show perspective views that illustrate a method of forming photonic crystals in accordance with the present invention. As shown in FIG. 3A, the present invention is formed on a conventionally-prepared, p-type semiconductor substrate 310. Substrate 310, in turn, includes electromagnetic structures that respond to electromagnetic radiation. In the example shown in FIG. 3A, an n+ region 312 is formed at the surface of substrate 310 to form a p-n photodiode. Other examples of an electromagnetic structure include a Schottky photodiode, a photoresistor, and a phototransistor.

Figure 3B:
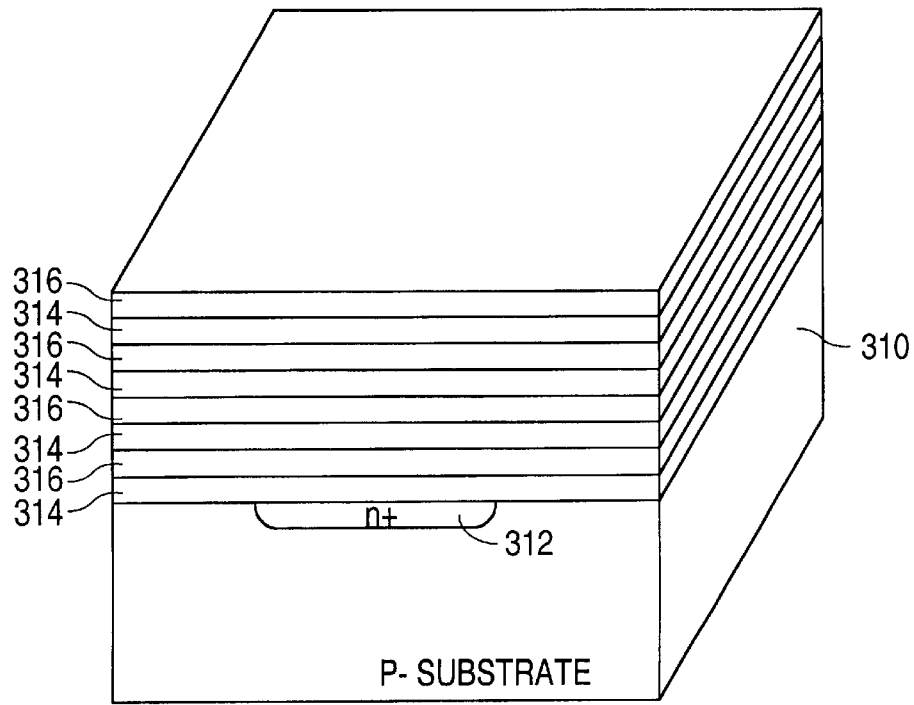

As shown in FIG. 3B, the present invention begins by forming alternating layers of two materials with different dielectric constants. In the example shown in FIG. 3B, alternating layers of a first material 314 and a second material 316 are formed. First layer of material 314 and second layer of material 316 can be formed from, for example, two different dielectric materials (e.g., oxide and nitride), a dielectric material and a semiconductor material (e.g., silicon), and a dielectric material and a metal layer. The materials used to form layers 314 and 316, the thickness of layers 314 and 316, and the number of layers 314 and 316 are defined by the desired characteristics of the resulting photonic crystal.

Figure 3C:
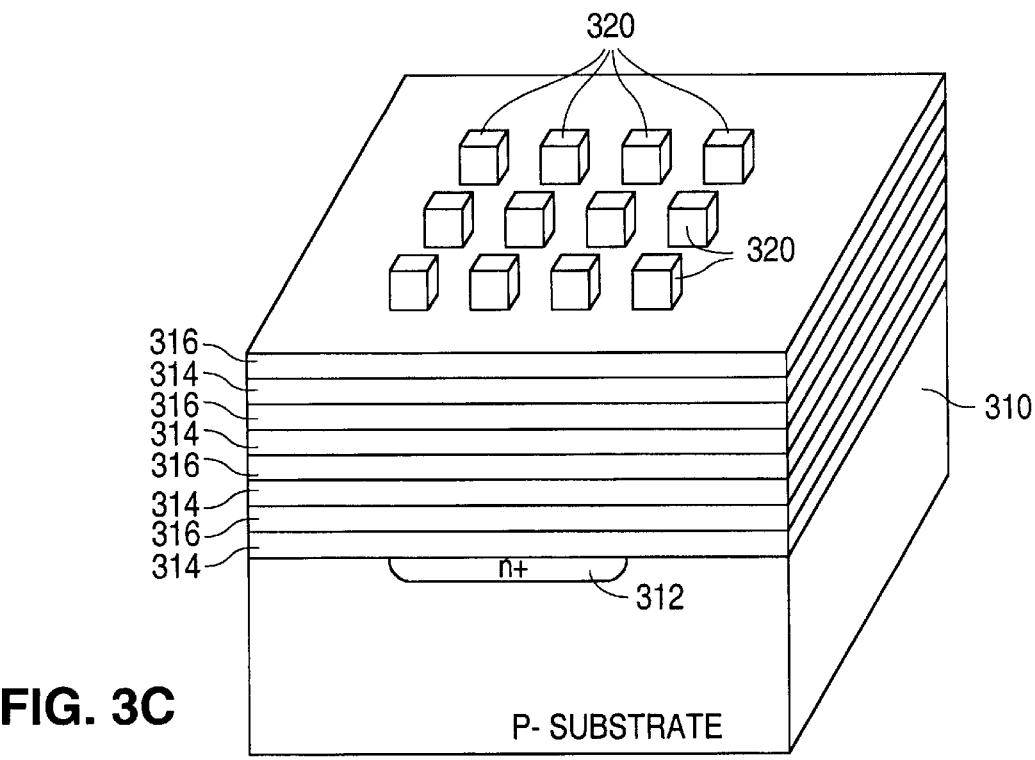

Following this, as shown in FIG. 3C, a number of masking elements 320 is formed on the top layer of the alternating layers of material, such as by forming and patterning a layer of photoresist. The pattern of masking elements 320 can have any shape, while the spacing between masking elements is defined by the desired characteristics of the resulting photonic crystal.

Figure 3D:
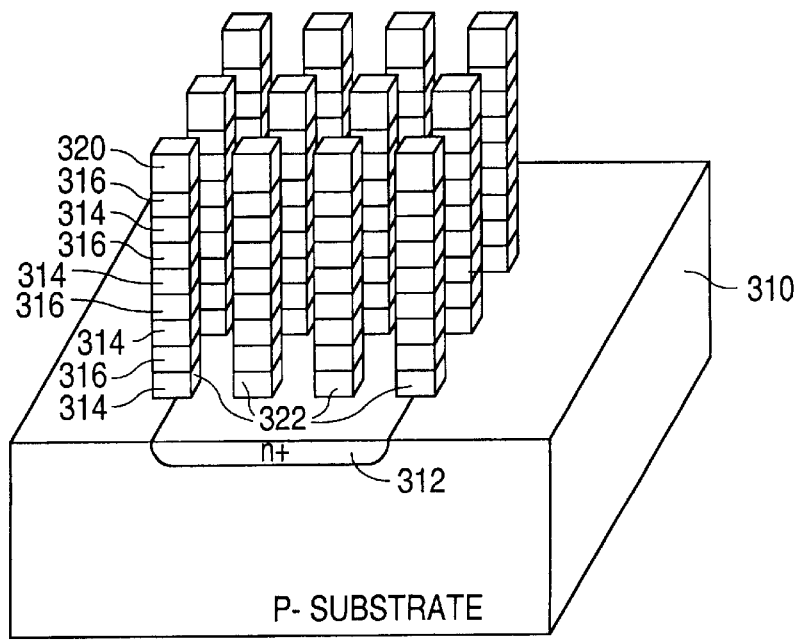

Next, as shown in FIG. 3D, the exposed regions of the top layer of material, and the regions underlying the exposed regions, are anisotropically etched until the regions of the first layer of material that underlie the exposed regions have been removed from the surface of substrate 310. As further shown in FIG. 3D, the anisotropic etch forms a number of spaced-apart, photonic stacks 322. Masking elements 320 are then removed.

Figure 3E:
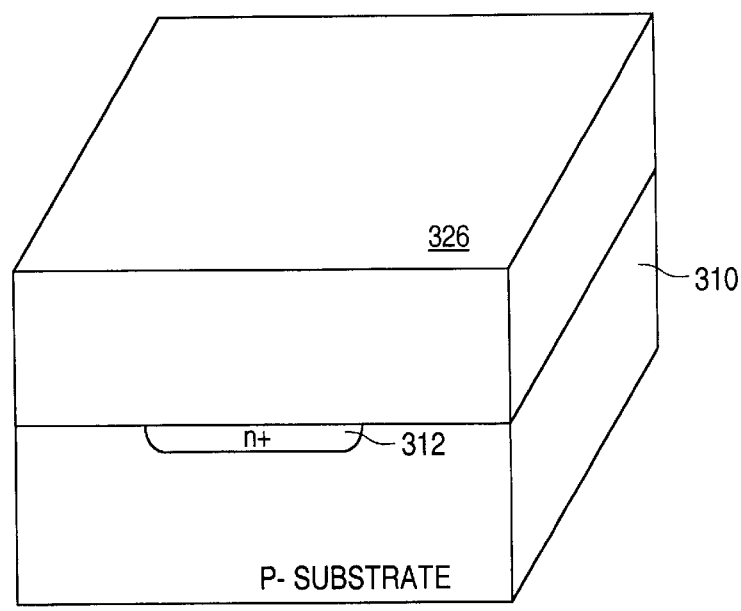

Once masking elements 320 have been removed, as shown in FIG. 3E, a third layer of material 326 is formed on the exposed surface of substrate 310 and photonic stacks 322 to fill up the spaces between photonic stacks 322. Third layer of material 326 can be implemented with, for example, a dielectric material that is the same as or different from the dielectric material used in photonic stacks 322.

Figure 3F:
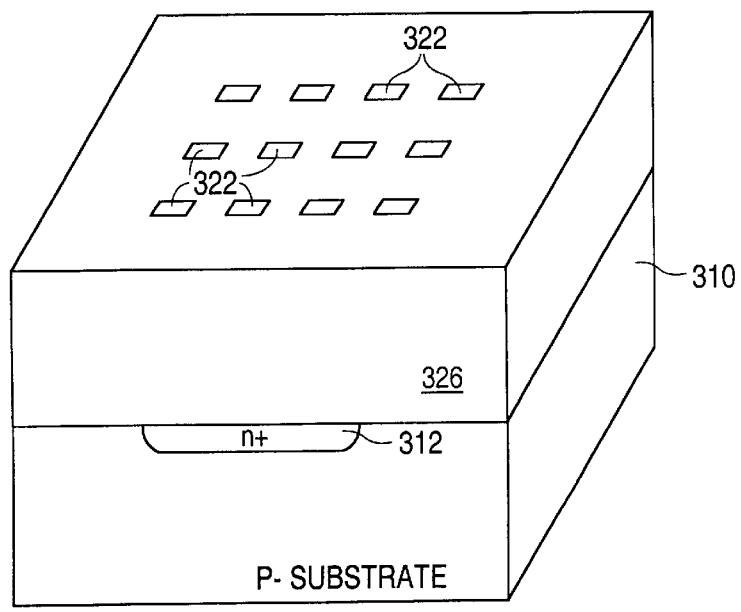

Following this, as shown in FIG. 3F, third layer of material 326 is planarized using conventional planarization techniques, such as chemical-mechanical polishing, until the top surfaces of photonic stacks 322 are exposed.

Figure 4:
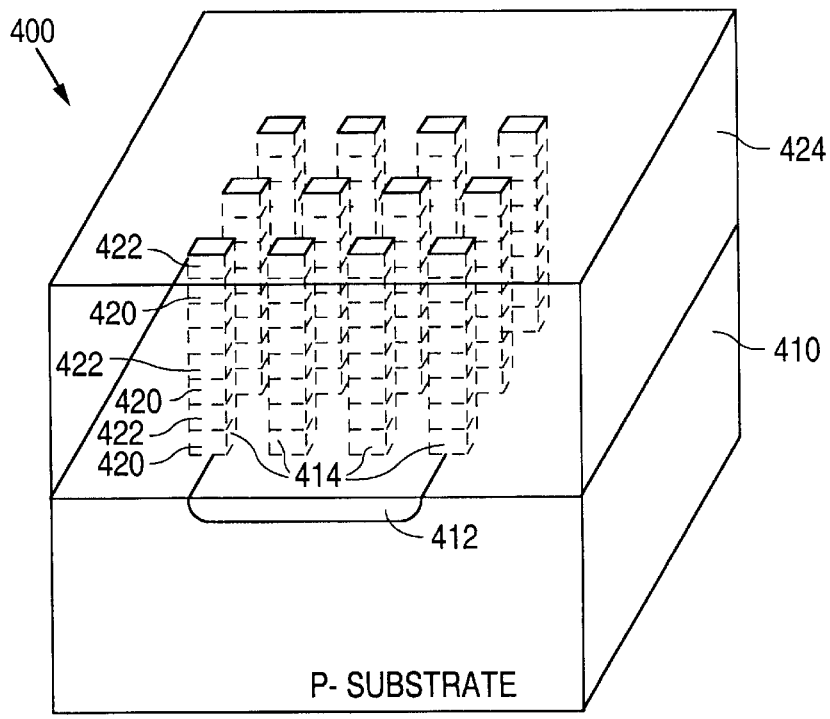
FIG. 4 is a perspective view illustrating a photonic crystal 400 formed using the steps described in FIGS. 3A–3F in accordance with the present invention.

FIG. 4 shows a perspective view that illustrates a photonic crystal 400 formed using the steps described in FIGS. 3A–3F in accordance with the present invention. As shown in FIG. 4, crystal 400 is formed on a semiconductor substrate 410 that includes a receiving area 412 formed in the surface of substrate 410. Receiving area 412 is part of a structure that responds to electromagnetic radiation such as, for example, a n+ region formed in a p-type substrate.

As further shown in FIG. 4, crystal 400 includes a plurality of regularly spaced-apart photonic stacks 414 that are formed on the surface of substrate 410 over receiving area 412. Each photonic stack 414, in turn, includes an alternating pattern of a first layer of material 420 and a second layer of material 422. Materials 420 and 422 have a different dielectric constant, which is defined by the requirements of the photonic crystal, and can include two types of dielectrics, a dielectric and a semiconductor material, and a dielectric and a metal.

In addition, crystal 400 also includes an interstack material 424 that is formed on substrate 410 to fill up the space between stacks 414. Material 424 can be the same as material 420 or material 422, or can be different from both materials 420 and 422, such as a dielectric with a dielectric constant that is different from the dielectric constants of materials 420 and 422.

As shown in FIG. 4, the top surface of interstack material 424 is substantially coplanar with the top surfaces of the stacks 414. Although the characteristics of crystal 400 are altered, the top surface of interstack material 424 can alternately be above or below the top surfaces of stacks 414. (The planarizing step shown in FIG. 3F can be omitted if a highly viscous material is used for third layer of material 326.)

Figure 5:
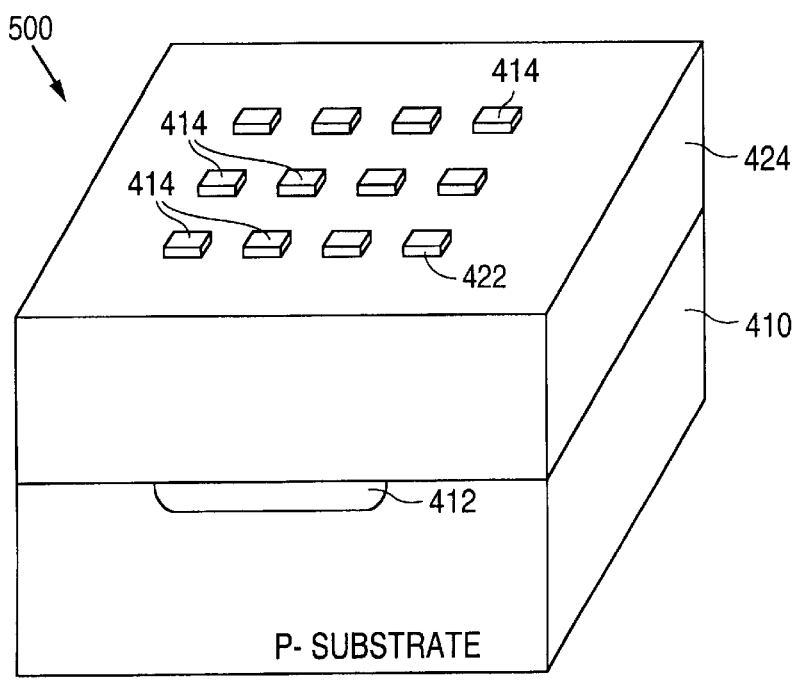
FIG. 5 is a perspective view illustrating a photonic crystal 500 in accordance with the present invention.

FIG. 5 shows a perspective view that illustrates a photonic crystal 500 in accordance with the present invention. Crystal 500 is similar to crystal 400 and, as a result, utilizes the same reference numerals to designate the structures that are common to both crystals. As shown in FIG. 5, the top surface of interstack material 424 is formed below the top surfaces of stacks 414.

Figure 6:
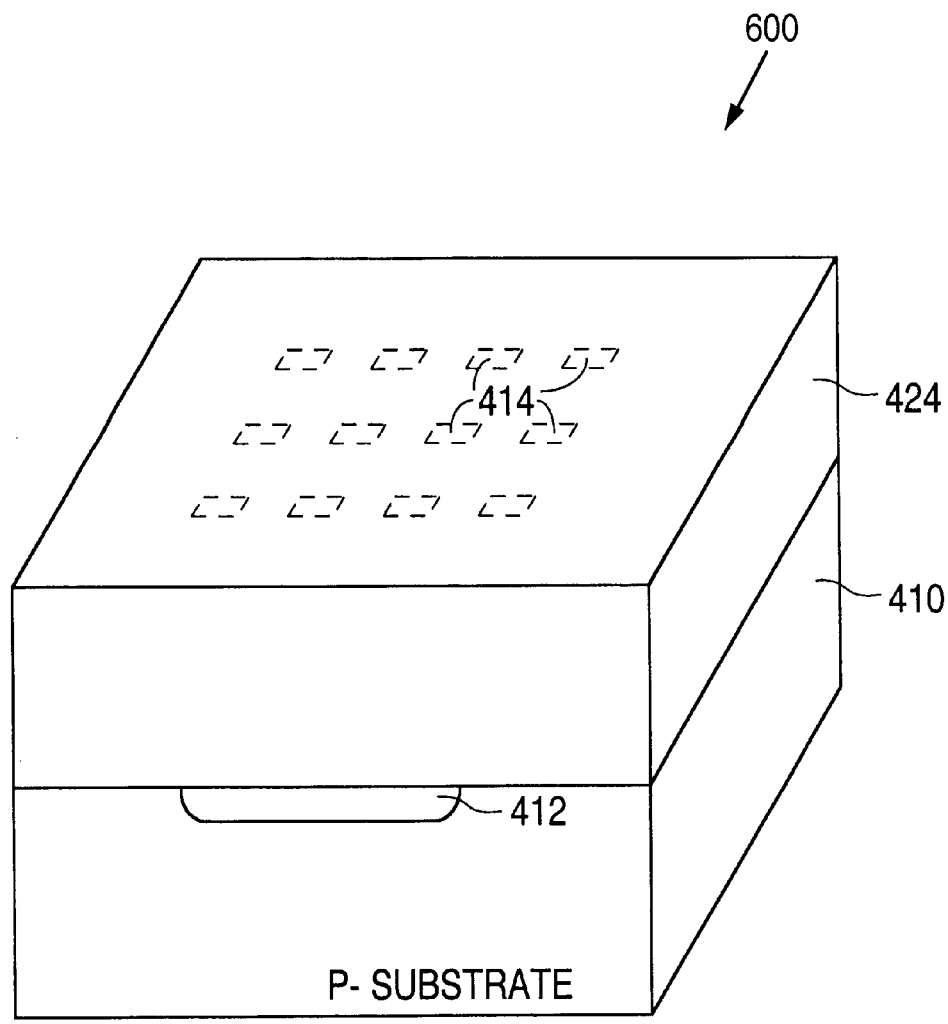
FIG. 6 is a perspective view illustrating a photonic crystal 600 in accordance with the present invention.

FIG. 6 shows a perspective view that illustrates a photonic crystal 600 in accordance with the present invention. Crystal 600 is similar to crystal 400 and, as a result, utilizes the same reference numerals to designate the structures that are common to both crystals. As shown in FIG. 6, the top surface of interstack material 424 is formed above the top surfaces of stacks 414.

One advantage of the present invention is that a photonic crystal can be formed using a semiconductor-based fabrication process. Thus, since semiconductor devices can be formed using deep sub-micron fabrication processes, the crystals of the present invention do not suffer from the size limitations of photonic crystal 100.

In addition, the present invention requires substantially fewer processing steps than the steps required to form crystal 200. Further, since a semiconductor-based fabrication process is utilized, a photonic crystal can be formed as part of an integrated circuit that includes circuitry which responds to the electromagnetic radiation received by the photonic crystal.

It should be understood that various alternatives to the method of the invention described herein may be employed in practicing the invention. Thus, it is intended that the following claims define the scope of the invention and that methods and structures within the scope of these claims and their equivalents be covered thereby.

What is claimed is:

1. A method of forming a photonic crystal on a semiconductor substrate, the substrate having a receiving region, the method comprising the steps of:

forming a first layer of material over the substrate, the first layer of material having a first dielectric constant;

forming a second layer of material on the first layer of material, the second layer of material having a second dielectric constant;

repeating the forming the first layer step and the forming the second layer step a predetermined number of times to form a multi-layered structure with alternating layers, the multi-layered structure having a top layer and a plurality of underlying layers, the top layer having a top surface;

etching the top layer and the underlying layers to form a plurality of photonic stacks and a space between the photonic stacks, the plurality of photonic stacks having a plurality of top surfaces; and forming a layer of interstack material over the substrate to fill up the space between the photonic stacks.

2. The method of claim 1 wherein the first layer of material is a dielectric.

3. The method of claim 1 wherein the layer of interstack material has a top surface that is substantially coplanar with the top surfaces of the stacks.

4. The method of claim 1 wherein the top surface of the layer of interstack material is above the top surfaces of the stacks.

5. The method of claim 1 wherein the top surface of the layer of interstack material is below the top surfaces of the stacks.

6. The method of claim 1 wherein the layer of interstack material is a dielectric having a dielectric constant that is equal to the dielectric constant of the layer of first material.

7. The method of claim 1 wherein the layer of interstack material is a dielectric having a dielectric constant that is different from the dielectric constant of the layer of first material.

8. The method of claim 1 and further comprising the step of planarizing the layer of interstack material, the layer of interstack material having a top surface.

9. The method of claim 8 wherein the layer of interstack material has a top surface that is substantially coplanar with the top surfaces of the stacks.

10. The method of claim 8 wherein the top surface of the layer of interstack material is above the top surfaces of the stacks.

11. The method of claim 8 wherein the top surface of the layer of interstack material is below the top surfaces of the stacks.

12. The method of claim 8 wherein the layer of interstack material is a dielectric having a dielectric constant that is equal to the dielectric constant of the layer of first material.

13. The method of claim 8 wherein the layer of interstack material is a dielectric having a dielectric constant that is different from the dielectric constant of the layer of first material.

* * * * *